(12) United States Patent
Takahashi

(10) Patent No.: US 7,721,838 B2
(45) Date of Patent: May 25, 2010

(54) COLLISION OBSTACLE DISCRIMINATION DEVICE FOR VEHICLE

(75) Inventor: Hisashi Takahashi, Kariya (JP)

(73) Assignee: Denso Corporation, Kariya (JP)

( * ) Notice: Subject to any disclaimer, the term of this patent is extended or adjusted under 35 U.S.C. 154(b) by 1093 days.

(21) Appl. No.: 11/390,669

(22) Filed: Mar. 28, 2006

(65) Prior Publication Data
US 2006/0220808 A1 Oct. 5, 2006

(30) Foreign Application Priority Data
Apr. 1, 2005 (JP) ............... 2005-106354

(51) Int. Cl.
B60K 28/10 (2006.01)
B60R 19/02 (2006.01)
G08G 1/16 (2006.01)

(52) U.S. Cl. .............. 180/274; 280/735; 293/4; 296/187.09; 701/45; 701/301

(58) Field of Classification Search ............ 180/274; 280/735, 784; 293/4; 296/187.01, 187.09; 296/187.11; 340/436, 437, 903; 701/45, 701/301
See application file for complete search history.

(56) References Cited

U.S. PATENT DOCUMENTS

| | | | | |
|---|---|---|---|---|
| 5,326,133 A * | 7/1994 | Breed et al. | ............ | 280/735 |
| 5,364,158 A * | 11/1994 | Watanabe et al. | ...... | 296/187.09 |
| 5,785,368 A * | 7/1998 | Hartmann et al. | ........... | 293/134 |
| 6,106,039 A * | 8/2000 | Maki | ........................ | 293/132 |
| 6,212,456 B1 * | 4/2001 | Stride | ........................ | 701/45 |
| 6,327,527 B1 * | 12/2001 | Imai et al. | .................... | 701/45 |
| 6,329,910 B1 * | 12/2001 | Farrington | .................. | 340/436 |
| 6,510,914 B2 * | 1/2003 | Ishizaki et al. | ............. | 180/274 |
| 6,540,275 B1 * | 4/2003 | Iwamoto et al. | ............... | 293/24 |
| 6,559,763 B2 * | 5/2003 | Murphy et al. | .............. | 340/436 |
| 6,561,301 B1 * | 5/2003 | Hayashi et al. | ............ | 180/274 |
| 6,701,238 B2 * | 3/2004 | McConnell | .................. | 701/45 |
| 6,784,792 B2 | 8/2004 | Mattes et al. | | |
| 6,832,145 B2 * | 12/2004 | Takafuji et al. | ............... | 701/45 |
| 6,882,916 B2 * | 4/2005 | Takafuji et al. | ............... | 701/45 |
| 7,024,293 B2 * | 4/2006 | Ishizaki et al. | ................ | 701/45 |
| 7,036,621 B2 * | 5/2006 | Takafuji et al. | ............ | 180/274 |
| 7,137,472 B2 * | 11/2006 | Aoki | .......................... | 180/274 |

(Continued)

FOREIGN PATENT DOCUMENTS

JP 2003260994 A * 9/2003

(Continued)

Primary Examiner—Paul N. Dickson
Assistant Examiner—Laura Freedman
(74) Attorney, Agent, or Firm—Harness, Dickey & Pierce, PLC

(57) ABSTRACT

A collision obstacle discrimination device for a vehicle has at least one upper detection unit arranged between a bumper and side members and at least one lower detection unit disposed at a lower side of the upper detection unit. The upper detection unit detects at least a component of a side-member extension direction of a collision energy when an obstacle collides with the bumper. The lower detection unit detects a collision energy which is closer to the ground than the component of the side-member extension direction of the collision energy detected by the upper detection unit. A discrimination unit is further provided to sort-distinguish the obstacle by comparing the collision energy detected by the upper detection unit and that detected by the lower detection unit.

5 Claims, 7 Drawing Sheets

U.S. PATENT DOCUMENTS

| | | | |
|---|---|---|---|
| 7,148,792 B2 * | 12/2006 | Takafuji et al. | 340/436 |
| 7,207,410 B2 * | 4/2007 | Song et al. | 180/274 |
| 7,236,866 B2 * | 6/2007 | Takafuji et al. | 701/45 |
| 7,353,087 B2 * | 4/2008 | Takafuji et al. | 701/1 |
| 7,416,231 B2 * | 8/2008 | Takahashi et al. | 293/102 |
| 2004/0020701 A1 * | 2/2004 | Aoki | 180/274 |
| 2004/0186643 A1 * | 9/2004 | Tanaka et al. | 701/45 |
| 2006/0185922 A1 * | 8/2006 | Tanabe | 180/274 |
| 2006/0231321 A1 * | 10/2006 | Takahashi | 180/274 |

FOREIGN PATENT DOCUMENTS

JP  2004074972 A * 3/2004

\* cited by examiner

COLLISION OBSTACLE DISCRIMINATION DEVICE FOR VEHICLE

CROSS REFERENCE TO RELATED APPLICATION

This application is based on a Japanese Patent Application No. 2005-106354 filed on Apr. 1, 2004, the disclosure of which is incorporated herein by reference.

FIELD OF THE INVENTION

The present invention relates to a collision obstacle discrimination device for actuating a protection device, for example, a pedestrian-protecting airbag and the like.

BACKGROUND OF THE INVENTION

Recently, a pedestrian-protecting airbag system for a vehicle is developed to protect a pedestrian. When the vehicle collides with the pedestrian, the pedestrian-protecting airbag system provides an airbag which is deployed on a bonnet of the vehicle to prevent a head portion and a breast portion of the pedestrian from colliding with the bonnet or a windshield of the vehicle.

Thus, a collision obstacle discrimination device becomes necessary for an actuation of the pedestrian-protecting airbag system. That is, it is necessary for the collision obstacle discrimination device to real-time discriminate between a pedestrian who is to be protected by the deployed airbag and other objects which are unnecessarily protected. In the case where the pedestrian-protecting airbag is unnecessarily deployed, an extra repair cost is to be spent. Moreover, the collision obstacle discrimination device is required to have a quick response performance, because the pedestrian-protecting airbag is to be deployed earlier than the violent collision of the pedestrian with the vehicle.

Referring to U.S. Pat. No. 6,784,792-B2, for example, each of the bonnet and a bumper of the vehicle is provided with a collision detection sensor, to judge whether or not the obstacle is a pedestrian based on outputs of the sensors.

In this case, the single sensor is attached to the bonnet so that the collision obstacle cannot be sort-distinguished until colliding with the bonnet. That is, the quick response performance of the discrimination device referring to JP-2003-535769A is inferior. Thus, when the obstacle is a pedestrian, it is difficult to deploy the pedestrian-protecting airbag to protect the pedestrian before the pedestrian violently collides with the bonnet. Furthermore, because the collision detection sensor is attached to the bonnet, the obstacle having a total height smaller than that of the bonnet cannot be substantially sort-distinguished.

SUMMARY OF THE INVENTION

In view of the above-described disadvantages, it is an object of the present invention to provide a collision obstacle discrimination device for a vehicle to instantly sort-distinguish an obstacle including that having a small total height, so that a pedestrian-protecting airbag and the like can be deployed before a violent collision of the obstacle with a bonnet of the vehicle in the case where the obstacle is a pedestrian.

According to the present invention, a collision obstacle discrimination device for a vehicle has at least one upper detection unit which is arranged between a bumper of the vehicle and side members of the vehicle, at least one lower detection unit which is disposed at a lower side of the upper detection unit with respect to a direction perpendicular to a ground, and a discrimination unit. The upper detection unit detects at least a component of a collision energy when an obstacle collides with the bumper. The component is in an extension direction of the side member. The lower detection unit detects a collision energy which is closer to the ground than the component of the side-member extension direction of the collision energy detected by the upper detection unit. The discrimination unit sort-distinguishes the obstacle by comparing the collision energy detected by the upper detection unit and that of the lower detection unit.

Thus, the collision energy applied to the bumper can be detected by the upper detection unit and the lower detection unit, so that the obstacle can be sort-distinguished immediately after the obstacle collides with the bumper. The collision energy indicates a violence degree of the collision and can be calculated through a collision load, a vehicle acceleration or the like.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

A collision obstacle discrimination device for a vehicle according to a first embodiment of the present invention will be described with reference to FIGS. 1-7.

Figure 1A:
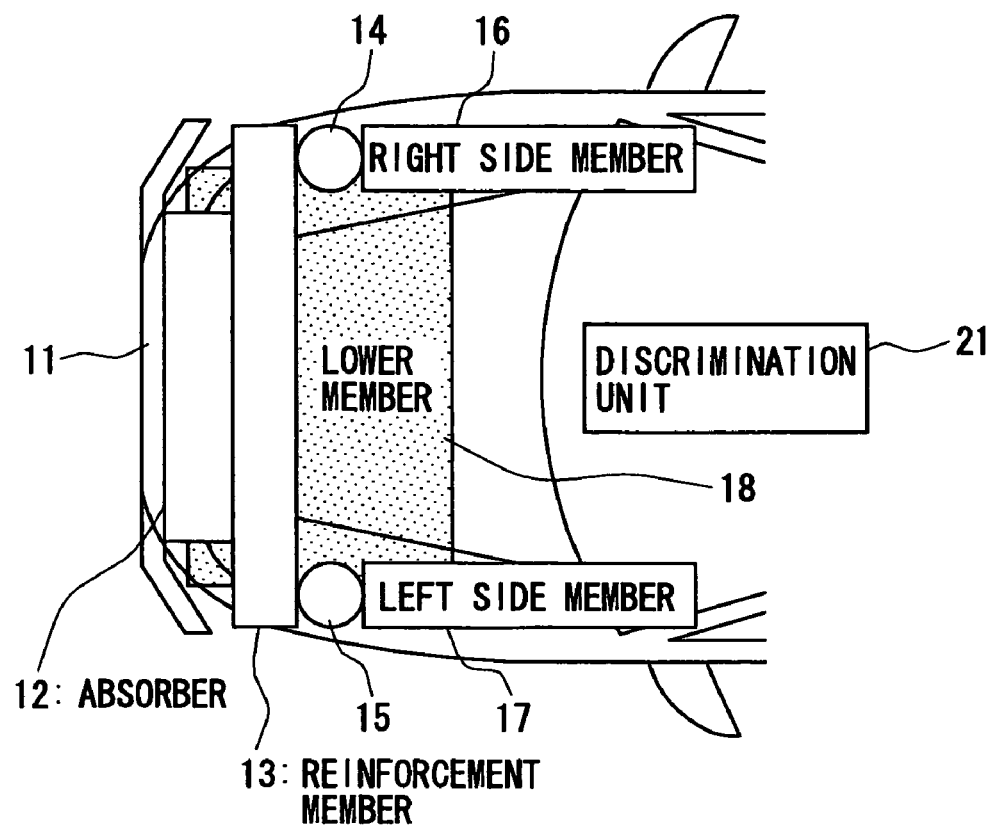
FIG. 1A is a schematic plan view showing a collision obstacle discrimination device for a vehicle according to a first embodiment of the present invention.

As shown in FIG. 1A, a front bumper 11 of the vehicle is arranged at a front surface (with respect to vehicle traveling direction) of an absorber 12 of the vehicle, and extends in the vehicle width direction (perpendicular to vehicle traveling direction). In the case where an obstacle collides with the front bumper 11, the front bumper 11 can be deformed so that the impact on the obstacle is buffered by the absorber 12.

The absorber 12 is disposed at a front surface of a reinforcement member 13 of the vehicle. At least one upper detection unit is arranged between the reinforcement member 13 and side members 16, 17. The upper detection unit can be constructed of a right load cell 14 and a left load cell 15, for example.

In this case, the reinforcement member 13 is fixed to the right side member 16 and the left side member 17, respectively through the right load cell 14 and the left load cell 15. The right load cell 14 is mounted between a rear surface of the reinforcement member 13 and a front surface of the right side member 16. The left load cell 15 is mounted between the rear surface of the reinforcement member 13 and a front surface of the left side member 17.

Figure 1B:
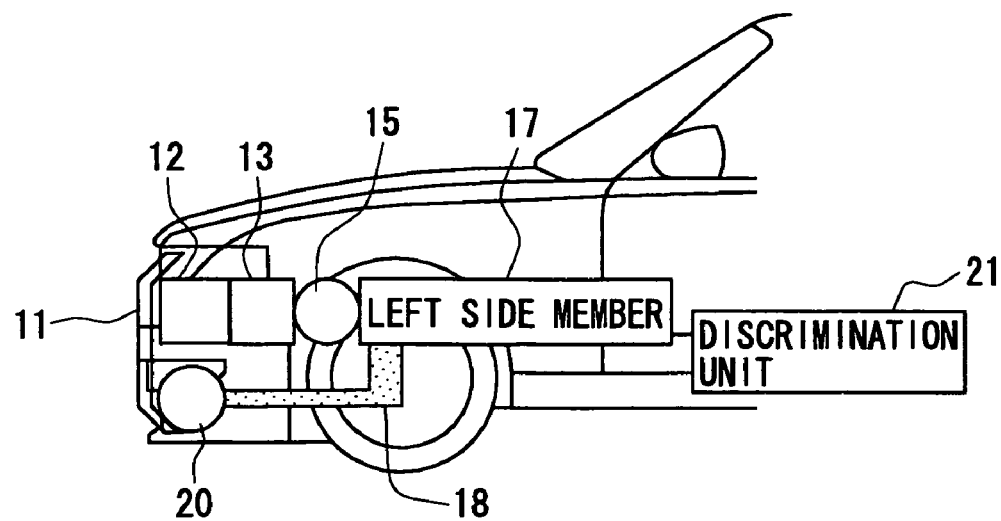
FIG. 1B is a schematic side view of the collision obstacle discrimination device.
Figure 2:
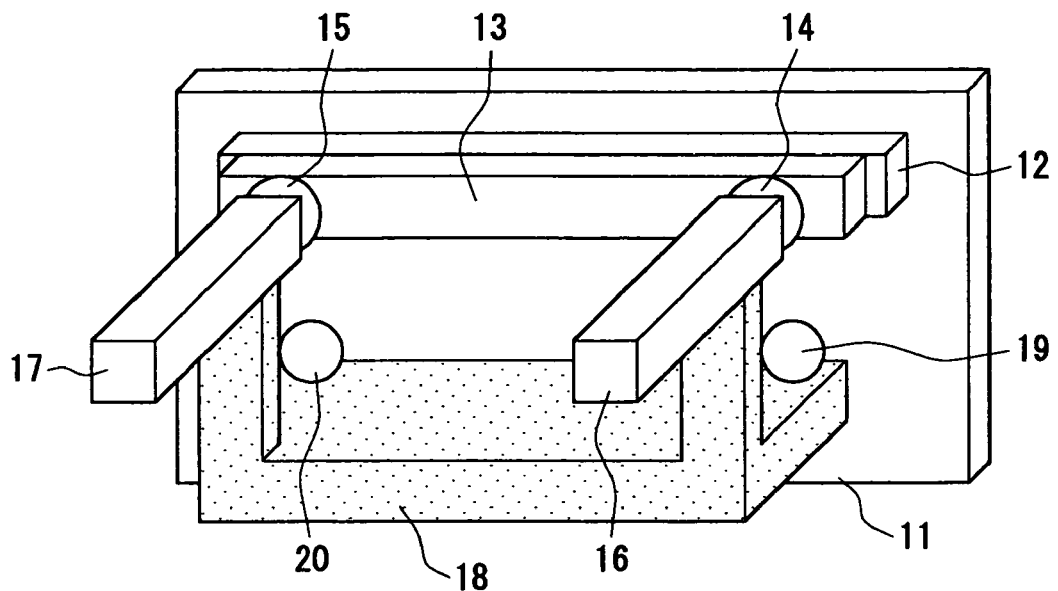
FIG. 2 is a partial perspective view showing the collision obstacle discrimination device which is mounted in the vehicle according to the first embodiment.

Referring to FIGS. 1B and 2, a lower member 18 is constructed of a plate portion and two stay portions. The two stay portions (i.e., stay portion of right side and stay portion of left side) respectively extend from lower surfaces of the right side member 16 and the left side member 17 toward the vehicle lower side and the vehicle front side, to have a L-like shape when being viewed in the vehicle width direction. The plate portion has a substantially flat plate shape which is substantially parallel to the ground. Two vehicle-width-direction ends of the plate portion are respectively integrated with the stay portions of the right side and the left side, to construct the lower member 18. The vehicle width direction corresponds to the vehicle left-right direction.

At least one lower detection unit is arranged at a front end (at side of front bumper 11) of the lower member 18. The lower detection unit can be constructed of, for example, a right G sensor 19 and a left G sensor 20, which are respectively attached to a right portion and a left portion of the front end of the lower member 18. The lower detection unit is disposed at the lower side of the upper detection unit with respect to the direction perpendicular to the ground.

When an obstacle collides with an upper portion of the front bumper 11, the impact due to the collision is buffered by the absorber 12, and then transmitted to the right load cell 14 and the left load cell 15 through the reinforcement member 13 so that the upper detection unit outputs signals responding to at least a component of a side-member extension direction of the collision energy.

On the other hand, when the obstacle collides with the lower portion of the front bumper 11, the impact due to the collision is transmitted to the right G sensor 19 and the left G sensor 20, so that the lower detection unit outputs signals responding to the collision energy.

The output signals from the right load cell 14, the left load cell 15, the right G sensor 19 and the left G sensor 20 are calculated and processed by a discrimination unit 21. Thus, the collision energy due to the collision between the vehicle and the obstacle can be determined.

In the present invention, each of sensors (e.g., load cell 14, 15) can be constructed of, for example, a single sensing portion which is mounted at the vehicle construction member.

Figure 3:
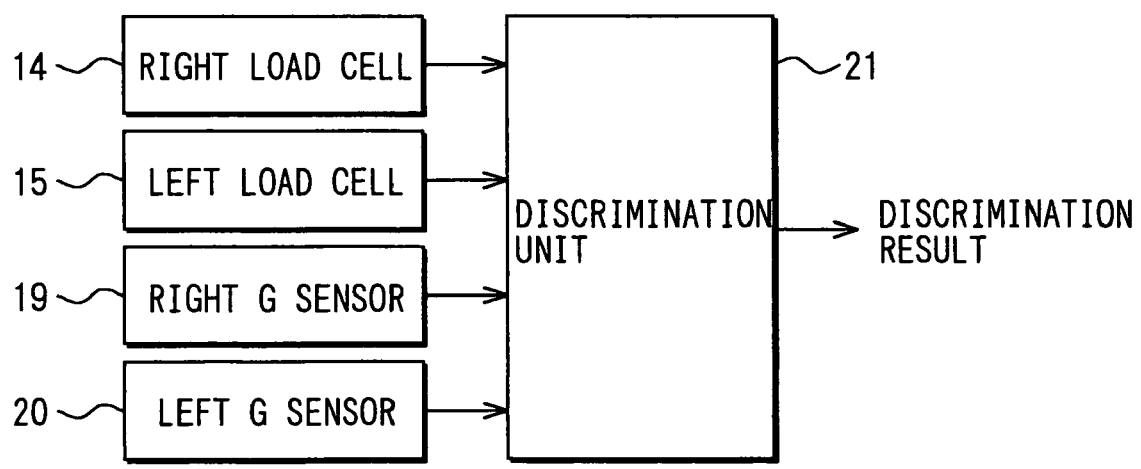
FIG. 3 is a block diagram showing an input and an output in an interior of the collision obstacle discrimination device according to the first embodiment.

The discrimination unit 21 is arranged, for example, on a floor in the vehicle. The discrimination unit 21 can be constructed of a signal process circuit in which a microprocessor is embedded, for example. Referring to FIG. 3, the output signals from the right load cell 14, the left load cell 15, the right G sensor 19 and the left G sensor 20 are sent to the discrimination unit 21, which performs an obstacle discrimination process (described later) shown in FIG. 7.

Figure 4:
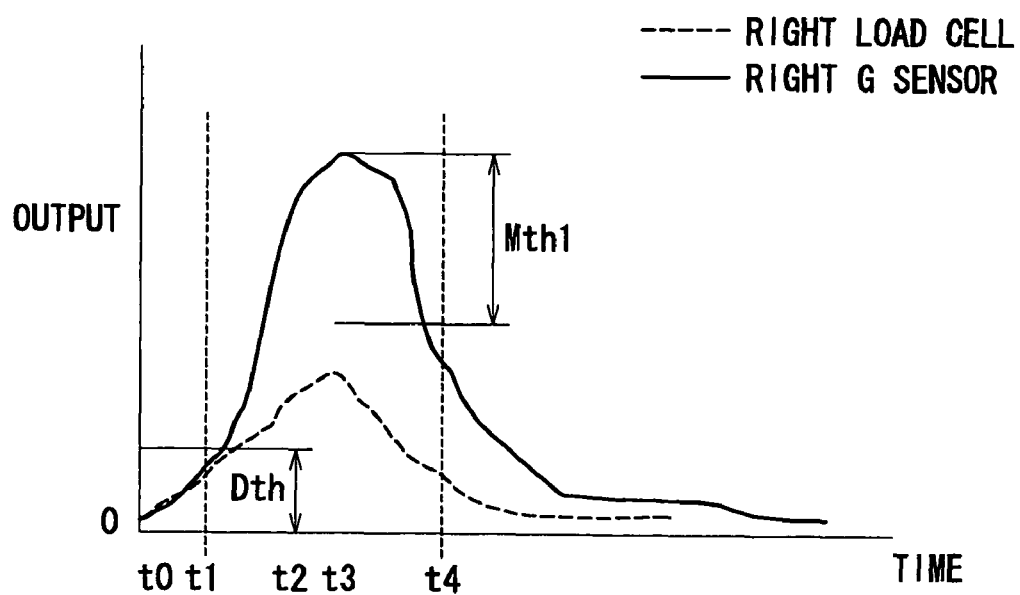
FIG. 4 is a graph showing a relation between an output of a load cell and the time and that between an output of a G sensor and the time in the case where an obstacle is fixed on the ground and has a large total height.
Figure 5:
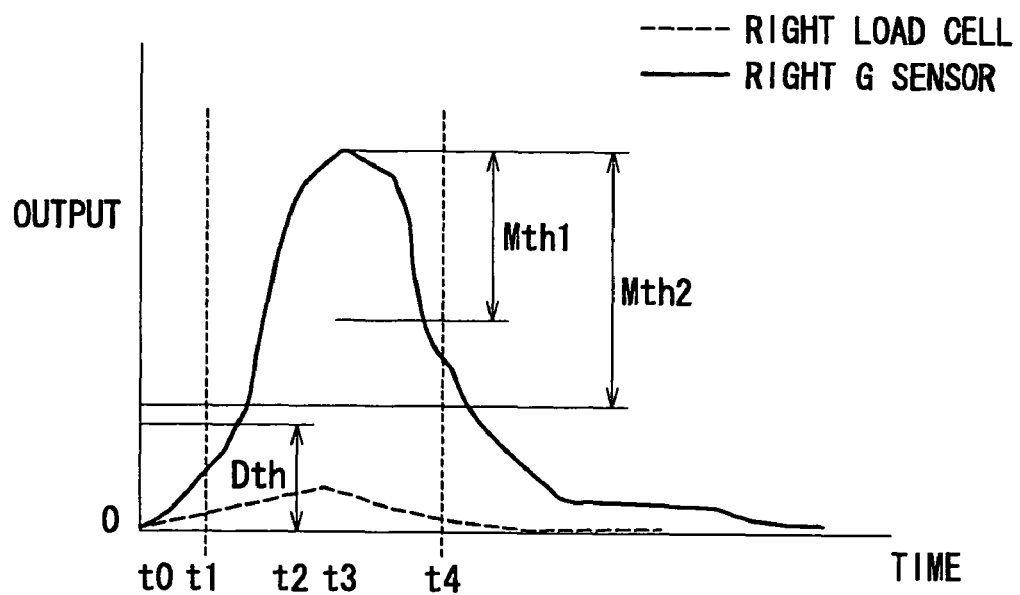
FIG. 5 is a graph showing a relation between the output of the load cell and the time and that between the output of the G sensor and the time in the case where the obstacle is fixed on the ground and has a small total height.
Figure 6:
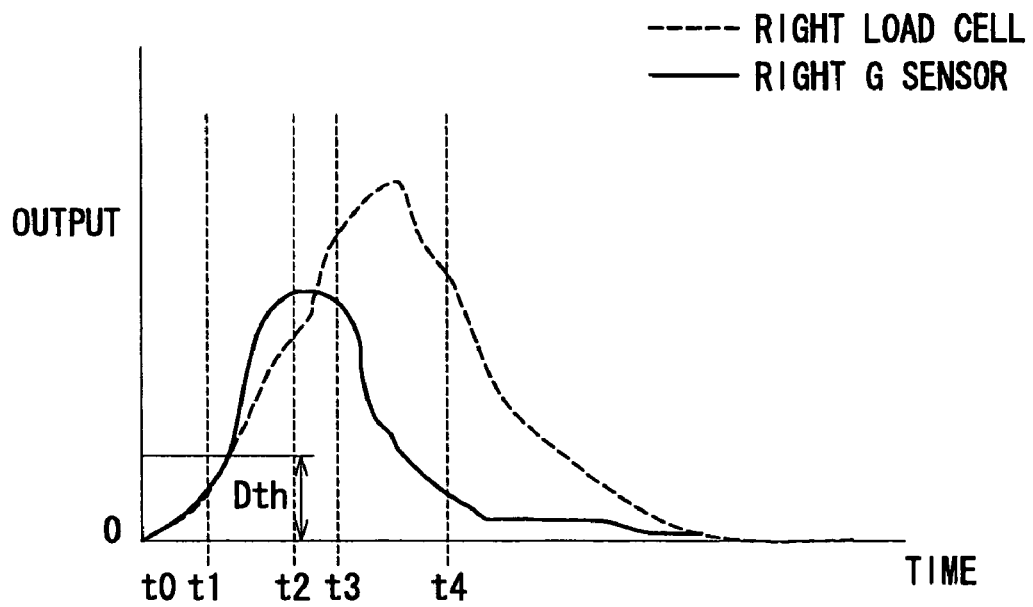
FIG. 6 is a graph showing a relation between the output of the load cell and the time and that between the output of the G sensor and the time in the case where the obstacle is not fixed on the ground to have a high barycenter.

FIG. 4 shows relations between the time (after collision occurrence) and the outputs (e.g., collision load signals and acceleration signals) of the right load cell 14 and the right G sensor 19, in the case of a collision with an obstacle such as a road-side marker which is fixed on the ground and has a total height larger than those of the right side member 16 and the left side member 17. FIG. 5 shows the relations between the time (after collision occurrence) and the outputs (e.g., collision load signals and acceleration signals) of the right load cell 14 and the right G sensor 19, in the case of a collision with an obstacle such as a roadway curb which is fixed on the ground and has a total height smaller than those of the right side member 16 and the left side member 17. FIG. 6 shows the relations between the time (after collision occurrence) and the outputs (e.g., collision load signals and acceleration signals) of the right load cell 14 and the right G sensor 19, in the case of a collision with an obstacle such as a human (e.g., pedestrian) which is not fixed on the ground to have a relatively high barycenter.

As shown in FIGS. 4-6, the output signals of the right load cell 14 which is attached to the right side member 16 and the right G sensor 19 which is attached to the lower member 18 are normalized, by setting as t0 the occurrence time of the collision between the obstacle and the front bumper 11. Referring to FIGS. 4-6, differences in the outputs of the load cells 14, 15, and the G sensors 19, 20 due to the obstacle sort variation will be described.

Referring to FIGS. 4 and 5, the output of the right load cell 14 shown in FIG. 4 is relatively large during the period from the time t1 to the time t4 because the total height of the obstacle is larger than those of the side members 16 and 17, as compared with that shown in FIG. 5.

Moreover, referring to FIGS. 4 and 6, during the period from the time t1 to the time t4, the output of the right load cell 14 shown in FIG. 4 is relatively small and the output of the right G sensor 19 is reflectively large, as compared with those shown in FIG. 6.

On the other hand, in the case where the obstacle (e.g., roadway curb) has the small total height and is fixed on the ground as shown in FIG. 5, the output of the right load cell 14 almost dose not vary during the period from the time t1 to the time t4, and the output of the right G sensor 19 is substantially same with that shown in FIG. 4.

Moreover, during the period from the time t1 to the time t4, the output of the right G sensor 19 shown in FIG. 5 is significantly larger than that of the right load cell 14 shown in FIG. 5, as compared with the case of the collision with the obstacle which is not fixed on the ground with reference to FIG. 6.

As shown in FIG. 6, both of the outputs of the right load cell 14 and the right G sensor 19 are large, and become different from each other with the time passing after the collision occurrence. In the initial collision period (from time t1 to time t2), the output of the right G sensor 19 is larger than that of the right load cell 14. During the period from the time t3 (being after time t2) to the time t4, the output of the right G sensor 19 is smaller than that of the right load cell 14. That is, during the period from the time t2 to the time t3, the output amplitudes of the right G sensor 19 and the right load cell 14 are reversed.

The reason is, after the collision occurrence, the obstacle will rotate to the side of a bonnet of the vehicle with the axis of the front bumper 11, at which the obstacle collides with the vehicle. Therefore, as compared with the cases shown in FIGS. 4 and 5 where the obstacles are fixed on the ground, the output of the right load cell 14 attached to the upper portion of the front bumper 11 is relatively large at the time t4 in the case of the obstacle (e.g., pedestrian) which is not fixed on the ground with reference to FIG. 6. Moreover, in this case, the output amplitude of the right G sensor 19 and that of the right load cell 14 are reversed during the period from the time t2 to the time t3.

The outputs of the left load cell 15 and the left G sensor 20 have the same variation tendency due to the different obstacle sorts, with what is described above with reference to FIGS. 4-6.

Next, the obstacle discrimination process (named process 71) of the discrimination unit 21 will be described with reference to FIG. 7. This obstacle discrimination process is started when one of the output signals from the load cells 14, 15, and the G sensors 19, 20 exceeds a predetermined value.

At first, at step S71, the collision energies (impacts) applied to the load cells 14, 15, and the G sensors 19, 20 are respectively calculated and outputted, based on the output signals from the load cells 14, 15, and the G sensors 19, 20. Then, at step S72, the collision energies (calculated at step S71) of the right load cell 14 and the left load cell 15 are averaged, to calculate a load-cell average value Da. Similarly, at step S73, the calculated collision energies of the right G sensor 19 and the left G sensor 20 are averaged to calculate a G-sensor average value Ga.

Thereafter, at step S74, the load-cell average value Da is compared with a threshold value Dth. When it is determined that the load-cell average value Da is larger than the threshold value Dth, step S75 will be performed. When it is determined that the load-cell average value Da is smaller than or equal to the threshold value Dth, step S76 will be performed.

As described above, as compared with the case (referring to FIG. 5) where the obstacle has the total height smaller than those of the side members 16 and 17 and is fixed on the ground, the output of the load cell 14, 15 is relatively large in the case (referring to FIG. 4) where the obstacle has the total height larger than those of the side members 16 and 17 and is fixed on the ground and in the case (referring to FIG. 6) where the obstacle is not fixed on the ground. Therefore, the threshold value Dth can be set, to distinguish the obstacle which has the total height smaller than those of the side members 16 and 17 and is fixed on the ground.

At step S75, when it is determined that the difference between the G-sensor average value Ga and the load-sensor average value Da is larger than a threshold value Mth1, step S77 will be performed. In the case where it is determined that the difference between the G-sensor average value Ga and the load-sensor average value Da is smaller than or equal to the threshold value Mth1, step S78 will be performed.

As described above with reference to FIGS. 4 and 6, in the case where the obstacle has the total height larger than those of the side members 16 and 17 and is fixed on the ground, the output of the G sensor 19, 20 is larger than that of the load cell 14, 15, as compared with the case of the collision with the obstacle which is not fixed on the ground. The threshold Mth1 is set based on this character, to discriminate between the obstacle which is not fixed on the ground and the obstacle which has the total height larger than those of the side members 16 and 17 and is fixed on the ground.

On the other hand, when it is determined that the load-cell average value Da is smaller than or equal to the threshold value Dth at step S74, step S76 will be performed. At step S76, it is judged whether or not the difference between the G-sensor average value Ga and the load-cell average value Da is larger than a threshold value Mth2. In the case where it is determined that the difference between the G-sensor average value Ga and the load-cell average value Da is larger than the threshold value Mth2, step S79 will be performed. On the other hand, in the case where it is determined that the difference between the G-sensor average value Ga and the load-cell average value Da is smaller than or equal to the threshold value Mth2, step S78 will be performed.

At step S79, it is determined that the obstacle has the total height smaller than those of the side members 16 and 17 and is fixed on the ground, because the conditions shown in FIG. 5 are satisfied. As described above, as compared with the case (referring to FIG. 6) of the obstacle which is not fixed on the ground, the output of the G sensor 19, 20 is significantly larger than that of the load cell 14, 15 in the case (referring to FIG. 5) of the obstacle which has the total height smaller than those of the side members 16 and 17 and is fixed on the ground. The threshold value Mth2 is set based on this character.

Step S78 is performed when the conditions shown in steps S75 and S76 are not satisfied. In this case, because the condition shown in FIG. 6 is satisfied, it is determined that the obstacle is not fixed on the ground to have the relatively high barycenter.

As described above, the collision obstacle discrimination device is provided with the upper detection unit including, for example, the right load cell 14 and the left load cell 15 which are disposed to be capable of detecting the collision with the upper portion of the front bumper 11, and the lower detection unit including, for example, the right G sensor 19 and the left G sensor 20 which are disposed to be capable of detecting the collision with the lower portion of the front bumper 11.

Thus, the obstacle can be sort-discriminated between the human (e.g., pedestrian) and the object having the total height smaller than those of the side members 16 and 17, immediately after the obstacle contacts the front bumper 11. Accordingly, in the case where the obstacle is the human, an airbag or the like can be actuated (deployed) to protect the human before the human violently collides with the vehicle bonnet.

Second Embodiment

Figure 8:
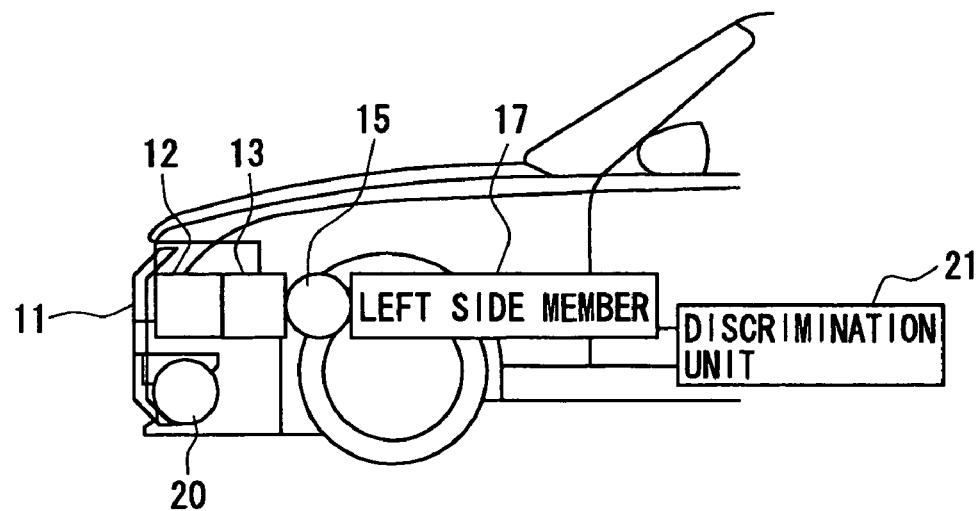
FIG. 8 is a schematic side view showing a collision obstacle discrimination device for a vehicle according to a second embodiment of the present invention.
Figure 9:
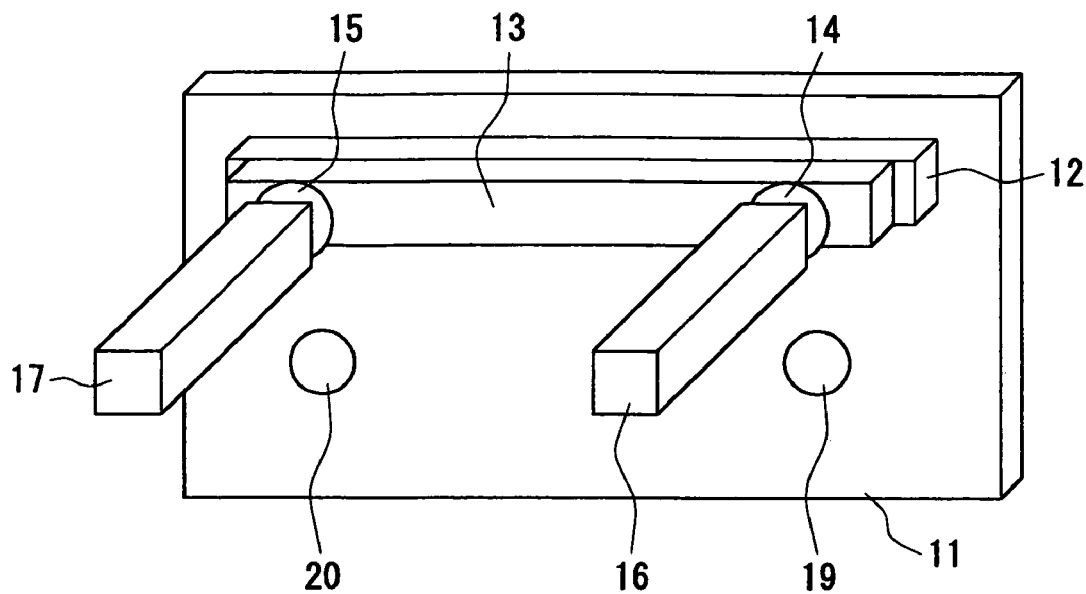
FIG. 9 is a partial perspective view showing the collision obstacle discrimination device which is mounted in the vehicle according to the second embodiment.

According to a second embodiment of the present invention, as shown in FIGS. 8 and 9, the lower detection unit (including right G sensor 19 and left G sensor 20, for example) is directly mounted at the lower portion of the bumper 11. In the above-described first embodiment, the right G sensor 19 and the left G sensor 20 are attached to the lower member 18.

According to the second embodiment, the impact applied to the lower portion of the bumper 11 can be detected (by lower detection unit) similarly to the first embodiment. Thus, the lower member 18 described in the first embodiment can be omitted so that the vehicle can be weight-reduced and cost-lowered.

Third Embodiment

A third embodiment of the present invention will be described with reference to FIG. 10. In this case, a right load cell 101 and a left load cell 102 (which construct upper detection unit) are respectively arranged at upper surfaces of the front ends (at side of reinforcement member 13) of the right side member 16 and the left side member 17. Because the side members 16, 17 and the reinforcement member 13 are parts of the skeletal frame of the vehicle body, the stiffness of the vehicle can be heightened by attaching the upper detection unit to the side members 16 and 17.

Figure 10:
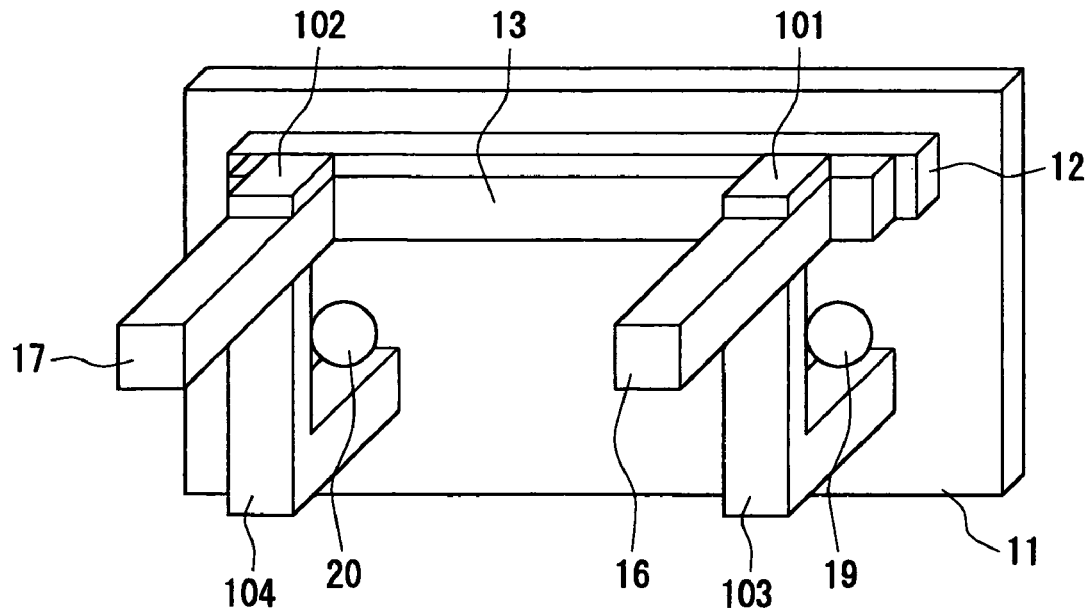
FIG. 10 is a partial perspective view showing a collision obstacle discrimination device for a vehicle according to a third embodiment of the present invention.

According to this embodiment, referring to FIG. 10, a right lower member 103 and a left lower member 104 extend respectively from the lower surfaces of the right side member 16 and the left side member 17 toward the vehicle lower side and the vehicle front side, to have a L-like shape when being viewed in the vehicle width direction. In this case, the right lower member 103 and the left lower member 104 respectively correspond to the two stay portions (of right side and left side) of the lower member 18 described in the first embodiment. The plate portion of the lower member 18 which connects the two stay portions is omitted in the third embodiment. That is, the right lower member 103 is independent from the left lower member 104 in the vehicle width direction. In this case, the right G sensor 19 and the left G sensor 20 (which construct lower detection unit) are respectively attached to front ends (at side of bumper 11) of the right lower member 103 and the left lower member 104.

Because the right lower member 103 and the left lower 104 are not connected with each other, the right G sensor 19 and the left G sensor 20 can independently detect the collision with the vehicle. For example, in the case where the obstacle collides with the right portion of the bumper 11, the impact applied to the right lower member 103 is not transmitted to the left lower member 104 because the right lower member 103 is not connected with the left lower member 104. Thus, the output difference between the right G sensor 19 and the left G sensor 20 is enlarged. Therefore, the collision direction of the obstacle colliding with the front bumper 11 can be easily determined through this output difference.

Thus, according to the third embodiment, the vehicle stiffness can be heightened and the collision direction of the obstacle can be easily determined.

Fourth Embodiment

A fourth embodiment of the present invention will be described with reference to FIGS. 11 and 12. In this case, a vehicle velocity sensor 111 are additionally provided for the collision obstacle discrimination device.

Figure 11:
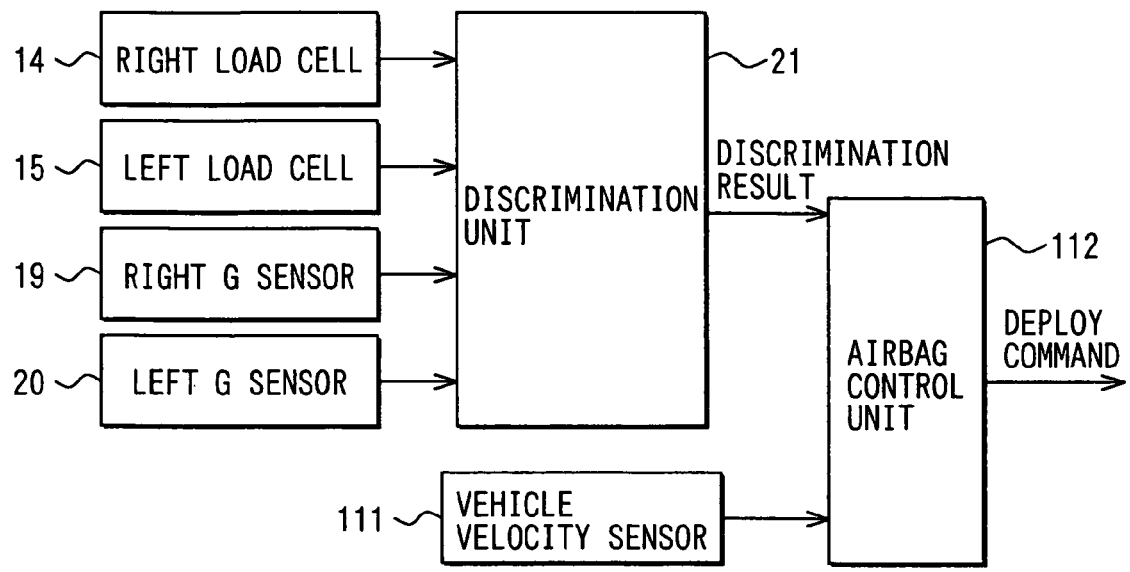
FIG. 11 is a block diagram showing an input and an output of an interior of a collision obstacle discrimination device for a vehicle according to a fourth embodiment of the present invention.

As shown in FIG. 11, output signals of the vehicle velocity sensor 111 and those of the discrimination unit 21 are sent to an airbag control unit 112 of the vehicle. The airbag control unit 112 performs an airbag control process shown in FIG. 12 based on the outputs signals from the vehicle velocity sensor 111 and the discrimination unit 21.

Figure 12:
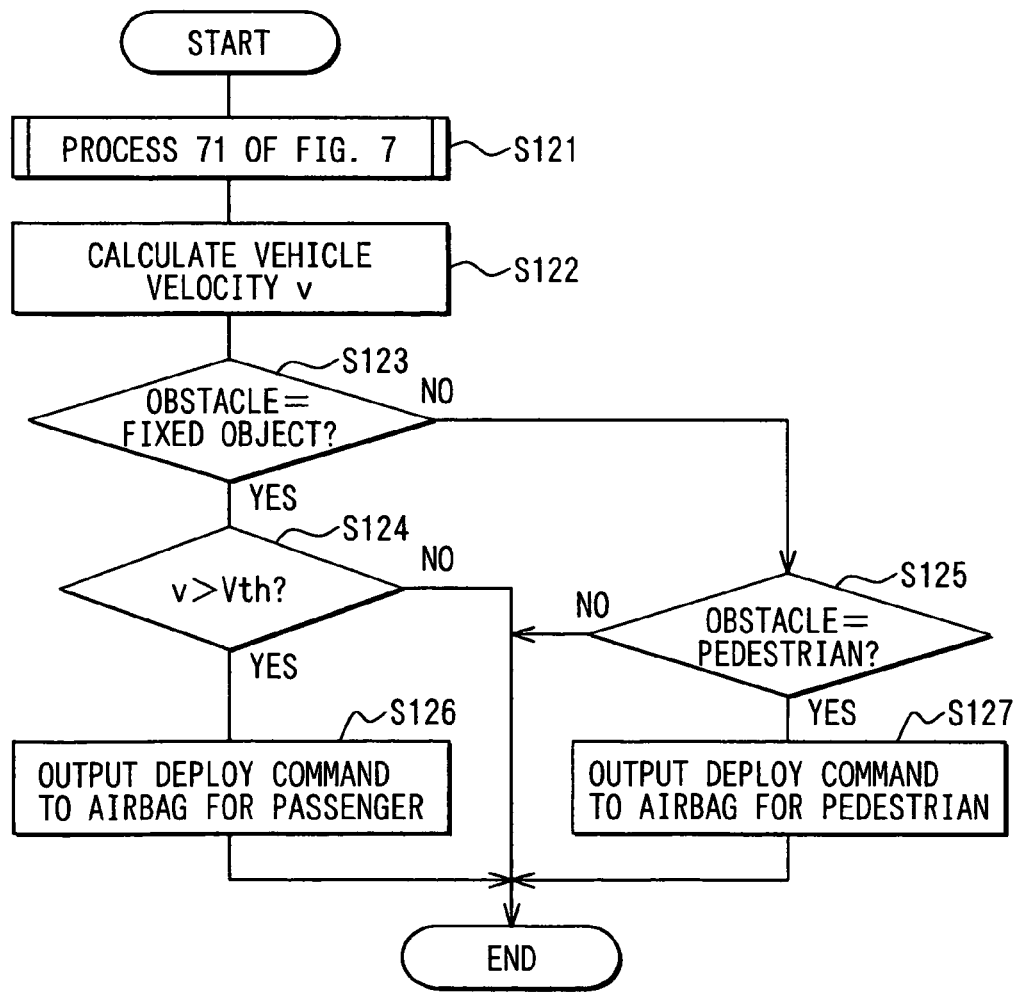
FIG. 12 is a flow chart showing an airbag control process of an airbag control unit according to the fourth embodiment.

Referring to FIG. 12, the airbag control process will be started when one of the output signals of the right load cell 14, the left load cell 15, the right G sensor 19 and the left G sensor 20 exceeds a predetermined value.

Figure 7:
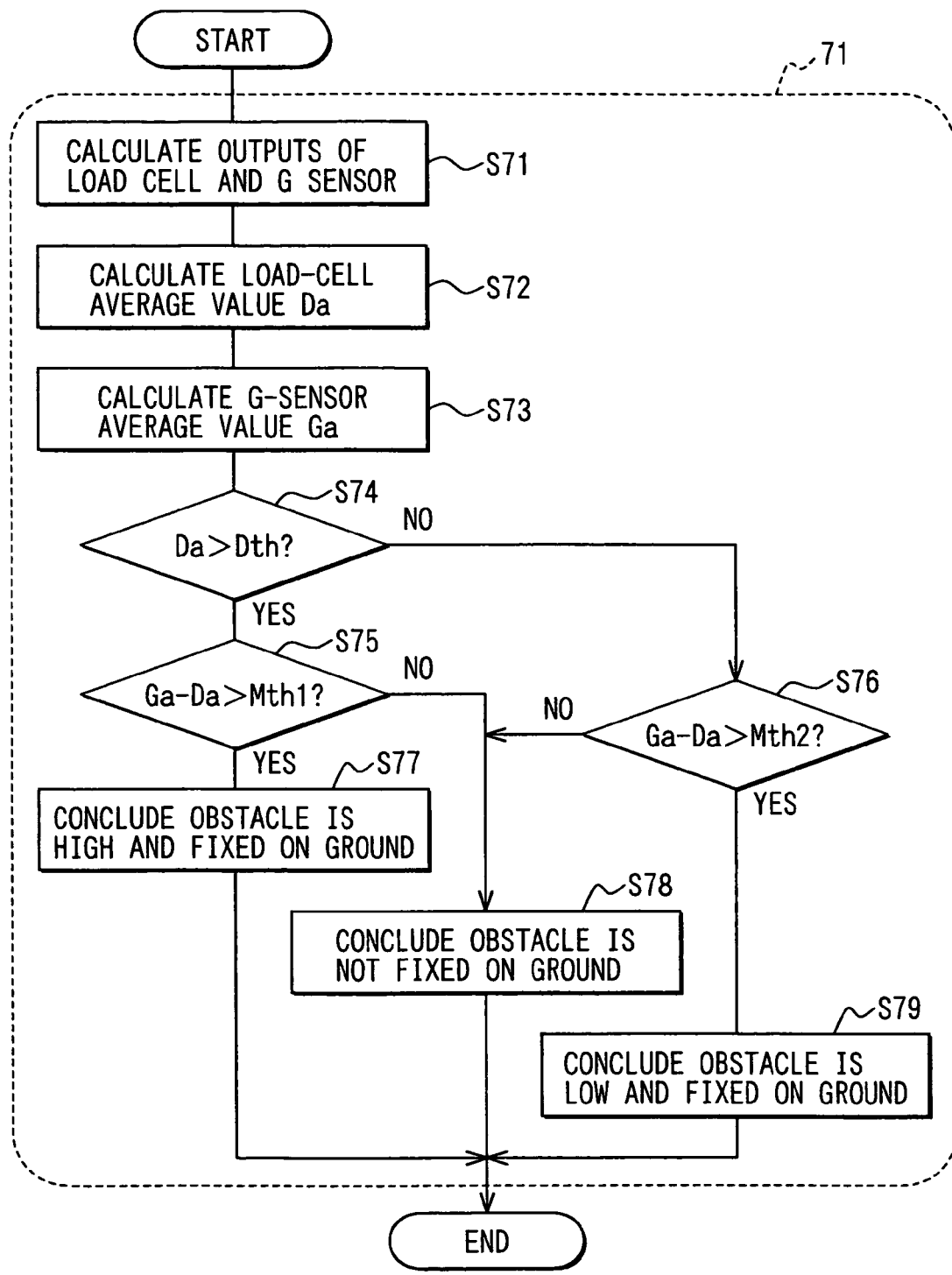
FIG. 7 is a flow chart showing a discrimination process of a discrimination unit according to the first embodiment.

At first, as step S121, the above-described obstacle discrimination process 71 shown in FIG. 7 is performed by the discrimination unit 21. Then, at step S122, a current velocity v of the vehicle is calculated based on the output signals from the vehicle velocity sensor 111. Thereafter, at step S123, it is judged whether or not the obstacle sort-discriminated at step S121 is an object fixed on the ground. When it is determined that the obstacle is fixed on the ground, step S124 will be performed. When it is determined that the obstacle is not fixed on the ground, step S125 will be performed.

At step S124, it is judged whether or not the current vehicle velocity v is larger than a threshold value Vth. When it is determined that the current vehicle velocity v is larger than the threshold value Vth, step S126 will be performed. At step S126, a passenger-protecting airbag deploy command is output to a passenger-protecting airbag. When it is determined that the current vehicle velocity v is smaller than or equal to the threshold value Vth, the airbag control process will be ended.

On the other hand, when it is determined that the obstacle is not fixed on the ground at step S123, step S125 will be performed. At step S125, it is further judged whether or not the obstacle sort-discriminated at step S121 is a pedestrian. When it is determined that the obstacle is the pedestrian, step S127 will be performed. At step S127, a pedestrian-protecting deploy command is sent to a pedestrian-protecting airbag. When it is determined that the obstacle sort-discriminated at step S121 is not the pedestrian, the airbag control process will be ended.

According to the collision obstacle discrimination device of the fourth embodiment, in addition to the effects described in the first embodiment, the passenger and the pedestrian can be respectively effectively protected by the passenger-protecting airbag, the pedestrian-protecting airbag and the like.

Other Embodiments

Although the present invention has been fully described in connection with the preferred embodiments thereof with reference to the accompanying drawings, it is to be noted that various changes and modifications will become apparent to those skilled in the art.

In the above-described embodiments, the upper detection unit is constructed of the load cells 14 and 15. However, the load cell 14, 15 can be also substituted by a mat-typed pressure sensor, a touch sensor, a G sensor or the like, to construct the upper detection unit. Similarly, the G sensor 19, 20 can be also substituted by a mat-typed pressure sensor, a touch sensor, a strain gauge sensor or the like to construct the lower detection unit.

In the above-described embodiments, the upper detection unit is constructed of the two load cells 14 and 15 which are respectively disposed at the vehicle right portion and the vehicle left portion, and the lower detection unit is constructed of the two G sensors 19 and 20 which are respectively disposed at the vehicle right portion and the vehicle left portion. However, the number of sensing members which construct each of the upper detection unit and the lower detection unit is not limited to those described in the above-described embodiments. For example, the upper detection unit can be also constructed of a single G sensor which is disposed at the substantial center of the reinforcement member 13. Similarly, the lower detection unit can be also constructed of a single G sensor which is arranged at the back side of the front bumper 11.

In the above-described embodiments, the upper detection unit is positioned at the boundary (or vicinity of boundary) between the reinforcement member 13 and the side member 16, 17. However, the upper detection unit can be also disposed at any position between the front bumper 11 and the side member 16, 17. For example, the upper detection unit can be arranged between the absorber 12 and the front bumper 11. Thus, the collision energy can be detected without being buffered by the absorber 12.

In the above-described embodiments, the obstacle is discriminated based on the outputs from the upper detection unit and the lower detection unit. However, the obstacle can be also discriminated based on other information, for example, an output from a vehicle camera or the like which can be combined with the outputs of the upper detection unit and the lower detection unit. Thus, the obstacle sort-discrimination accuracy can be further improved.

In the above-described embodiments, the obstacle colliding with the vehicle from the vehicle front side is sort-discriminated. However, the obstacle colliding with the vehicle from other directions can be also distinguished. For example, a strain gauge sensor can be sandwiched between a side member of the vehicle rear portion and a reinforcement member of the vehicle rear portion, and a G sensor can be arranged at a rear bumper of the vehicle rear portion. Thus, the obstacle colliding with the vehicle rear portion can be sort-distinguished.

In the first embodiment, referring to FIG. 7, at step S75, the relation between the G sensor average value Ga and the load cell average value Da is judged and processed. That is, when the difference between the G-sensor average value Ga and the load-cell average value Da is larger than the threshold value Mth1, it is determined that the obstacle has the total height larger than those of the side members 16 and 17 and is fixed on the ground.

However, the relation between the G-sensor average value Ga and the load-cell average value Da can be also judged based on other manner (criterion), for example, the value of the G-sensor average value Ga divided by the load-cell average value Da. In this case, at step S75 of the obstacle discrimination process, it is determined that the obstacle has the total height larger than those of the side members 16 and 17 and is fixed on the ground, when the value of the G-sensor average value Ga divided by the load-cell average value Da is larger than a threshold value Mth3.

Alternatively, the load-cell average value Da can be compared with a threshold value Mth4, and the G-sensor average value Ga can be compared with a threshold value Mth5. In this case, at step S75 of the obstacle discrimination process, when both the two comparison results (e.g., difference between average value and threshold value) are positive (TRUE), it is determined that the obstacle has the total height larger than those of the side members 16 and 17 and is fixed on the ground.

The obstacle discrimination process described in the first embodiment is only an example. Other criterion for sort-discriminating the obstacle (e.g., object fixed on ground) can be also used.

For example, the sensor output character such as the state transition in the case of the collision with the obstacle which is not fixed on the ground to have the relatively high barycenter can be also used as the discrimination criterion. Referring to FIG. 6, after the output of the lower detection unit keeps larger than that of the upper detection unit with a difference therebetween larger than or equal to a predetermined value (threshold value), the output of the lower detection unit approaches that of the upper detection unit. Thereafter, the amplitude relation between the output of the lower detection unit and that of the upper detection unit becomes inverse. That is, the output of the upper detection unit keeps larger than that of the lower detection unit with a difference therebetween larger than or equal to a predetermined value (threshold value). This state transition can be also used as the discrimination criterion for the obstacle non-fixed on the ground. Thus, the sort-discrimination accuracy of the obstacle can be further improved.

Moreover, the time concept can be also added to the discrimination criterion constructed of the sensor state transition, for example. For example, referring to FIG. 6, in the case where the obstacle is not fixed on the ground to have the high barycenter, after the output of the lower detection unit keeps larger than that of the upper detection unit with a difference therebetween larger than or equal to a predetermined value (threshold value) during the period between the time t1 to the time t2, the output of the lower detection unit approaches that of the upper detection unit during the period between the time t2 to the time t3. Thereafter, the amplitude relation between the output of the lower detection unit and that of the upper detection unit becomes inverse. That is, the output of the upper detection unit keeps larger than that of the lower detection unit with a difference therebetween larger than or equal to a predetermined value (threshold value) during the period between the time t3 to the time t4. This state transition can be also used as the discrimination criterion. Thus, the sort-discrimination accuracy of the obstacle can be further improved, as compared with the case where the time concept does not introduced into the discrimination criterion.

In the above-described embodiments, the obstacle is discriminated among three kinds, that is, the object which has the large total height and is fixed on the ground, the object which has the small total height and is fixed on the ground, and the object which is not fixed on the ground. However, the obstacle can be also discriminated among two kinds, that is, the object fixed on the ground and the object non-fixed on the ground.

In the case where the obstacle is not fixed on the ground, the output of the upper detection unit is relatively large as compared with the case where the obstacle is fixed on the ground. This character can be used for a discrimination between the obstacle fixed on the ground and the obstacle non-fixed on the ground. In this case, when the output of the upper detection unit is larger than or equal to a threshold value, it is determined that the obstacle is not fixed on the ground. When the output of the upper detection unit is smaller than the threshold value, it is determined that the obstacle is fixed on the ground. In this case, the collision obstacle discrimination device can be constructed through a significantly simple algorithm.

In the above-described embodiments, the threshold values (e.g., Dth and Mth1) are respectively used for the branch judgments in the obstacle discrimination process and the like. However, an inference using a Fuzzy Set, a neural network or the like can be also used for the branch judgments, instead of the threshold values.

In the above-described embodiments, the threshold values (Dth, Mth1, Mth2 and the like) are used for the obstacle sort-discrimination. However, the threshold values can be not fixed. For example, the threshold values can be manually or automatically adjustable, considering that the ambient temperature variation and the age deterioration of the upper detection unit and the lower detection unit. Thus, the obstacle sort-discrimination accuracy can be further improved.

Such changes and modifications are to be understood as being in the scope of the present invention as defined by the appended claims.

What is claimed is:

1. A collision obstacle discrimination device for a vehicle, comprising:
    at least one upper detection unit which is arranged between a bumper and side members of the vehicle,
    the upper detection unit detecting at least a component of a collision energy when an obstacle collides with the bumper, the component being in an extension direction of the side members;
    at least one lower detection unit which is disposed at a lower side of the upper detection unit with respect to a direction perpendicular to a ground,
    the lower detection unit detecting a collision energy which is closer to the ground than the component of the side-member extension direction of the collision energy detected by the upper detection unit; and a discrimination unit which sort-discriminates the obstacle by comparing the collision energy detected by the upper detection unit and the collision energy detected by the lower detection unit; wherein the discrimination unit determines that the obstacle is not fixed on the ground, in the case where the collision energy detected by the upper detection unit is larger than or equal to a threshold value;

the discrimination unit determines that the obstacle is not fixed on the ground, in the case where the collision energy detected by the upper detection unit is smaller than the collision energy detected by the lower detection unit with a difference therebetween larger than or equal to a first threshold value during a first predetermined period and the collision energy detected by the lower detection unit is smaller than the collision energy detected by the upper detection unit with a difference therebetween larger than or equal to a second threshold value during a second predetermined period, and the second predetermined period being after the first predetermined period.

2. The collision obstacle discrimination device according to claim 1, wherein the threshold value, the first threshold value and the second threshold value are adjustable responding to at least one of an ambient temperature and age deterioration degrees of the upper detection unit and the lower detection unit.

3. A collision obstacle discrimination device for a vehicle, comprising:

at least one upper detection unit which is arranged between a bumper and side members of the vehicle, the upper detection unit detecting at least a component of a collision energy when an obstacle collides with the bumper, the component being in an extension direction of the side members;

at least one lower detection unit which is disposed at a lower side of the upper detection unit with respect to a direction perpendicular to a ground, the lower detection unit detecting a collision energy which is closer to the ground than the component of the side-member extension direction of the collision energy detected by the upper detection unit; and a discrimination unit which sort-discriminates the obstacle by comparing the collision energy detected by the upper detection unit and the collision energy detected by the lower detection unit; wherein the discrimination unit determines that the obstacle is fixed on the ground, in the case where the collision energy detected by the lower detection unit is larger than or equal to a threshold value; and the discrimination unit determines that the obstacle is fixed on the ground and higher than an arrangement position of the upper detection unit, in the case where the collision energy detected by the lower detection unit is larger than the collision energy detected by the upper detection unit with a difference therebetween, which is larger than or equal to a third threshold value and smaller than a fourth threshold value.

4. The collision obstacle discrimination device according to claim 3, wherein the threshold value, the third threshold value and the fourth threshold value are adjustable responding to at least one of an ambient temperature and age deterioration degrees of the upper detection unit and the lower detection unit.

5. A collision obstacle discrimination device for a vehicle, comprising:

at least one upper detection unit which is arranged between a bumper and side members of the vehicle, the upper detection unit detecting at least a component of a collision energy when an obstacle collides with the bumper, the component being in an extension direction of the side members;

at least one lower detection unit which is disposed at a lower side of the upper detection unit with respect to a direction perpendicular to a ground, the lower detection unit detecting a collision energy which is closer to the ground than the component of the side-member extension direction of the collision energy detected by the upper detection unit; and a discrimination unit which sort-discriminates the obstacle by comparing the collision energy detected by the upper detection unit and the collision energy detected by the lower detection unit; wherein the discrimination unit determines that the obstacle is fixed on the ground, in the case where the collision energy detected by the lower detection unit is larger than or equal to a threshold value; and the discrimination unit determines that the obstacle is fixed on the ground and lower than an arrangement position of the upper detection unit, in the case where the collision energy detected by the upper detection unit is smaller than the collision energy detected by the lower detection unit with a difference therebetween larger than or equal to a fourth threshold value.

* * * * *